United States Patent Office 3,704,269
Patented Nov. 28, 1972

3,704,269
FOAMS AND PROCESS OF MAKING
Harlan G. Freeman and Maurice F. Gillern, Seattle, Wash., assignors to Weyerhaeuser Company, Tacoma, Wash.
No Drawing. Filed Jan. 22, 1971, Ser. No. 109,048
Int. Cl. C08j 1/16
U.S. Cl. 260—2.5 F
16 Claims

ABSTRACT OF THE DISCLOSURE

Disclosed herein is a process of making thermosetting cellular foams, and the insoluble infusible foamed products made therefrom for use as insulating barriers in building construction and other applications where light weight insulating materials are needed. A foaming agent is blended into a liquid resin comprising the reaction product of (1) an aldehyde condensation polymer having reactive alkylol groups, modified by a nitrogen-containing compound and (2) an aldehyde or aldehyde-polyepoxide mixture. The resinous compositions form an insoluble, infusible, cured foam in 20 to 200 seconds at room temperature, making them useful in foaming-in-place applications.

CROSS REFERENCE

This application is a continuation-in-part of application Ser. No. 821,962 filed on May 5, 1969, entitled "Foams and Process of Making," and now abandoned.

BACKGROUND OF THE INVENTION

Field of the invention

This invention relates to a process of making resinous, cellular foams and the products therefrom.

PRIOR ART RELATING TO THE INVENTION

Resinous foams prepared from liquid condensation polymers of formaldehyde with phenol and/or urea are known. Cellular foams made by including an alkali metal bicarbonate and a water-soluble sulfonic acid into a phenol-formaldehyde partial reaction product are disclosed in U.S. Pat. 2,446,429. Phenolic foams are useful as insulating materials because of their temperature stability and self-extinguishing characteristics. However, phenolic foams have certain characteristics which have prevented their widespread use as insulating materials. They are somewhat brittle, friable and have poor flexibility. Urea-formaldehyde foams, while also being substantially flame-retardant, undergo excessive shrinkage during curing and drying, thus limiting their use in foaming-in-place applications where noninsulating voids must be avoided.

Numerous methods of overcoming the disadvantages of phenolic and urea foams have been proposed. These methods usually consist of some chemical modification of the basic polymer or the incorporation of other materials in the polymer mixture.

The present invention utilizes novel polymers into which a foaming agent is incorporated, the resulting foam curing rapidly, making the compositions most useful in foaming-in-place applications. Further, the phenolic foams of this invention can be made without the use of heat and/or acid conditions commonly employed in making the phenolic foams of the prior art.

SUMMARY OF THE INVENTION

This invention has as its main object a process for producing insoluble, infusible cellular foams by blending or incorporating a foaming agent into a liquid, modified aldehyde condensation polymer.

A further object of this invention is in the production of foams having improved characteristics making them useful for foaming-in-place applications.

The modified aldehyde condensation polymers used herein are thermosetting and cure rapidly at room temperature. Optionally, heat may be applied to increase cure speed. Foams made with the polymers are subject to little shrinkage on curing.

The modified aldehyde condensation polymers used in this invention are made by reacting an aldehyde condensation polymer having reactive alkylol groups with a nitrogen compound of the following types:

(1) Primary aromatic amines of the formula:

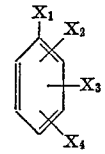

where:

$X_1$ is

—NH$_2$
—CH$_2$NH$_2$ $X_2$ is

—$X_1$
—OH
—OCH$_3$ $X_3$ is

—$X_1$
—COOH
—NO$_2$
—OCH$_3$
—OH
—CH$_3$
—NHCOCH$_3$
—H

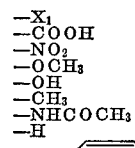

$X_4$ is $C_1$ to $C_4$ alkyl
—H and A is

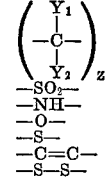

—SO$_2$—
—NH—
—O—
—S—
—C=C—
—S—S— where $Y_1$ and $Y_2$ are hydrogen or alkyl radicals having from 1 to 3 carbon atoms and Z is an integer from 0 to 2;

(2) Bis(aminoaryl) compounds having the formula:

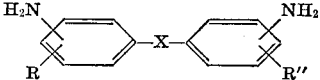

where R and R' are alkoxy, amino, hydrogen, hydroxyl, nitro, carboxyl or $C_1$ to $C_4$ alkyl and X is

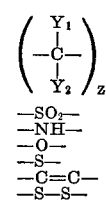

—SO$_2$—
—NH—
—O—
—S—
—C=C—
—S—S— where $Y_1$ and $Y_2$ are hydrogen or alkyl radicals having from 1 to 3 carbon atoms and Z is an integer ranging from 0 to 2;

(3) Aminonaphthalenes of the formula:

where R may be amino in any open ring position or hydroxyl in the 2, 5 and 8 ring positions when the amino group is in the 1 position; and (4) Heterocyclic nitrogen-containing compounds selected from the group consisting of 2,3-; 2,4-; 2,6-; or 3,4-diaminopyridine; pyrrole; N-methylpyrrole; 2,4-dimethylpyrrole; or 4,6-diaminopyrimidine.

The above mentioned polymers are cured by the addition of an alkylene donor such as an aldehyde. An aldehyde-epoxide mixture can also be employed for that purpose.

Foaming agents which are blended with the polymer include carbon dioxide liberating compounds, low boiling point polyhalogenated saturated fluorocarbons, lower aliphatic hydrocarbons, and lower aliphatic ethers.

The amine-modified polymers described herein have improved properties. In particular the amine-modified phenolformaldehyde foams are substantially infusible, insoluble, self-extinguishing, stable, and have greater flexibility and are generally less friable then conventional phenolic foams if desired. In addition, the thermosetting materials described herein form a cured foam in 20–200 seconds at room temperature which makes them useful for foamed-in-place applications. Even faster cure speeds can be achieved with the use of heat.

DETAILED DESCRIPTION OF THE INVENTION

Foams useful for insulation purposes are preferably substantially closed cell structures which have uniform cellular size. Such foams are stronger and more highly resistant to abrasion and water absorption than open-celled foams. When the resins are foamed in place as, for example, in the installation of insulating barriers in ceilings and walls of buildings the foam produced must not shrink to any substantial extent on curing and drying. The foams, produced according to this invention are substantially closed cell foams, do not shrink substantially on curing and are capable of curing rapidly at ambient temperature.

The resins of this invention are usually prepared as two component systems. Each component by itself has a relatively long gel time and is stable. On blending of the two components the resulting mixture cures rapidly at ambient temperature. To be able to produce satisfactory foams the foaming agents must be incorporated in one or both of the components of the resin mixture or added simultaneously or substantially simultaneously when the two resin components are mixed together.

The aldehyde condensation polymers which can be used in this invention have reactive alkylol groups, and are well known and commercially available. "Polymers," as used herein, means resinous mixtures not capable of crystallization nor having a sharp melting point. "Reactive alkylol groups" are alkylol groups capable of reacting with the nitrogen compounds used in this invention to modify the aldehyde condensation polymers. "Condensation" is used herein to mean a polymerization reaction in which a single molecule, such as water, is eliminated and is to be distinguished from "addition" in which no by-product is formed. Further, the aldehyde condensation polymers used in this invention exclude those having dominant amide forming substituents.

Three classes of polymers can be used: phenoplasts, aminoplasts, and ketone-aldehyde condensation polymers. They include such resins as the acid or base-catalyzed phenolic-aldehyde resins, urea-aldehyde resins, melamine-formaldehyde resins, acetone-formaldehyde resins, etc. The following references disclose method of preparing the condensation resins useful in this invention: "The Chemistry of Synthetic Resins" by Carleton Ellis, Reinhold Publishing Co., 1935; "Phenolic Resin Chemistry" by N. J. L. Megson, Academic Press, Inc., New York, 1958; "Aminoplasts" by C. P. Vale, Cleaver-Hume Press, Ltd., London, England; and British Pat. 480,316.

Specifically, the aldehyde condensation polymers which can be used include (1) phenoplasts comprising the condensation resins of an aldehyde such as formaldehyde with a phenolic type material such as phenol, phenol-resorcinol, xylenol, cresol, resorcinol, and their derivatives, (2) aminoplasts comprising the condensation resins of an aldehyde such as formaldehyde with compounds such as benzoguanamine, dicyandiamide, urea, melamine-urea, melamine, and their derivatives, and (3) ketone-aldehyde condensation resins such as acetone-formaldehyde, methyl ethyl ketone-formaldehyde, methyl isobutyl ketone formaldehyde, and the like. The preferred resins are water-soluble, liquid, thermosetting phenol-aldehyde resins of the novolac or resole types.

The aldehyde used in preparation of the condensation polymer may be (1) monofunctional (i.e. a monoaldehyde), or (2) polyfunctional, having at least two aldehyde groups separated by at most one carbon atom, and can be, for instance, formaldehyde, paraformaldehyde, polyoxymethylene, trioxane, acrolein, and aliphatic or cyclic aldehydes such as glyoxal, acetaldehyde, propionaldehyde, butyraldehyde, and furfuraldehyde. Condensation, when using formaldehyde, furfuraldehyde, paraformaldehyde, polyoxymethylene or trioxane, is accomplished with the use of a mildly acid, alkaline, or no catalyst. When using acrolein, glyoxal, acetaldehyde, propionaldehyde, or butyraldehyde, condensation is accomplished by combining the reactants in the presence of a strongly acid catalyst, neutralizing the reaction product, adding more aldehyde, and further reacting in the presence of a mildly acid, or alkaline, catalyst.

The preferred resins are generally prepared by condensation of one mole of a monohydric phenol with 0.7 to 2.5 moles of formaldehyde. The phenolic resins are condensed under acid or alkaline conditions. Other phenolic polymers, primarily those having a predominantly ortho-condensed molecular structure may be used. These resins are prepared by condensing 0.7 to 1.0 mole formaldehyde with 1 mole phenol in the presence of an ortho-directing catalyst such as calcium acetate. Such resins are known and are disclosed, for example, in British Pat. 615,335. Although phenol is the preferred reactant, the phenolic resins may be modified by incorporating into them predetermined amounts of dihydric phenols such as resorcinol or other polyhydroxy aromatic compounds.

The aldehyde condensation polymers described are modified by reaction with a nitrogen compound such as an amine. It is necessary, in order to produce the low-temperature fast curing products of this invention, to first produce the aldehyde condensation polymer and then subsequently modify that polymer with the nitrogen compound. Simultaneous reaction of all the reactants, i.e., phenol, formaldehyde and amine, produces an inferior, unusable heterogeneous mass, i.e., comprising essentially an amine-formaldehyde condensation polymer containing free phenol.

The amount of nitrogen compound used to react with the aldehyde condensation polymer may range from about 0.05 to 2.0 parts by weight of the nitrogen compound to each part by weight of the condensation polymer. Preferably 0.1 to 1.0 part by weight of the nitrogen compound to each part by weight of the condensation polymer is used. More than 2.0 parts by weight of the nitrogen compound to each part of the aldehyde condensation polymer can be used but there is little advantage in doing so.

The nitrogen compounds useful for modifying the aldehyde condensation polymers include:

(1) Primary aromatic amines having the formula:

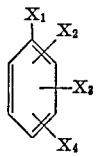

where:

$X_1$ is $-NH_2$
$-CH_2NH_2$ $X_2$ is $-X_1$
$-OH$
$-OCH_3$ $X_3$ is $-X_1$
$-COOH$
$-NO_2$
$-OCH_3$
$-OH$
$-CH_3$
$-NHCOCH_3$
$-H$

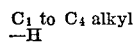

$X_4$ is $C_1$ to $C_4$ alkyl
$-H$ and A is

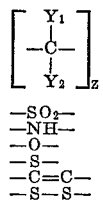

$-SO_2-$
$-NH-$
$-O-$
$-S-$
$-C=C-$
$-S-S-$ where $Y_1$ and $Y_2$ are hydrogen or alkyl radicals having from 1 to 3 carbon atoms and Z is an integer from 0 to 2;

(2) Bis(aminoaryl) compounds of the formula:

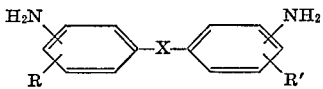

where R and R' are alkoxy, amino, hydrogen, hydroxyl, nitro, carboxyl or $C_1$ to $C_4$ alkyl and X is

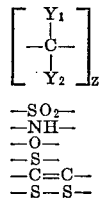

$-SO_2-$
$-NH-$
$-O-$
$-S-$
$-C=C-$
$-S-S-$ where $Y_1$ and $Y_2$ are hydrogen or alkyl radicals having from 1 to 3 carbon atoms and Z is an integer ranging from 0 to 2;

(3) Aminonaphthalenes of the formula:

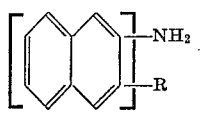

where R may be amino in any open ring position or hydroxyl in the 2, 5 and 8 ring positions when the amino group is in the 1 position; and (4) Heterocyclic nitrogen-containing compounds selected from the group consisting of 2,3-; 2,4-; 2,6-; or 3,4-diaminopyridine; pyrrole; N-methylpyrrole; 2,4-dimethylpyrrole; or 4,6-diaminopyrimidine.

Exemplary of the specific nitrogen-containing compounds which can be used to modify the phenolic polymers are the following:

4-aminosalicyclic acid
3,5-diaminobenzoic acid
o-hydroxyaniline
m-hydroxyaniline
o-phenylenediamine
m-phenylenediamine
p-phenylenediamine
1,2,4-triaminobenzene
1,3,5-triaminobenzene
2-amino-5-nitrophenol
2-aminoresorcinol
m-methoxyaniline
2,4,6-triaminotoluene
2,4-diaminodiphenylamine
1,3-diamino-4-methoxybenzene
1,3-diamino-4-nitrobenzene
1,4-diamino-2-nitrobenzene
2,4-diaminophenol
2,4-diaminotoluene
2,4-diaminoacetanilide
m-xylylenediamine
3,3'-dimethoxybenzidine
4,4'-oxydianiline
o-tolidine
4,4'-diaminodiphenylmethane
4,4'-diaminodiphenylsulfone
3,3'-diaminobenzidine
4,4'-diaminodiphenylamine
4,4'-diaminostilbene
4,4'-methylenedianiline
4,4'-diaminodiphenyldisulfide
1,5-diaminonaphthalene
1,8-diaminonaphthalene
1-amino-5-naphthol
1-amino-2-naphthol
2,7-diaminonaphthalene
1,2-diaminonaphthalene
2,3-diaminopyridine
2,4-diaminopyridine
2,6-diaminopyridine
3,4-diaminopyridine
N-methylpyrrole
pyrrole
4,6-diaminopyrimidine
2,4-dimethylpyrrole The preferred amines used in preparation of the foamed products of this invention include m-phenylenediamine, m-hydroxyaniline, 1,5-diaminonaphthalene, 2,6-diaminopyridine and 4,4'-methylenedianiline.

The amine-modified aldehyde condensation polymers are prepared by reacting the nitrogen compounds described with previously prepared aldehyde condensation polymer, usually under reflux conditions, in the presence of a small amount of water, methanol, water-methanol mixture, or other suitable carrier vehicle. As most of the reactions are exothermic in nature, cooling is frequently required. The reaction is best controlled by the slow addition of the nitrogen compound to the polymer or vice versa. The modified polymer forms one component of the two-component resin of this invention.

The second component of the resin is an alkylene donor and is typically either (1) an adlehyde or (2) an aldehyde-epoxide mixture. When the first and second components of the resin mixture described are blended together the mixture gels rapidly to an insoluble, infusible state at ambient temperature. When aldehyde alone is used it is added to the modified adduct to form an insoluble, infusible product. "Insoluble" is intended to mean not soluble in common solvents such as water, alcohols, ketones, hydrocarbons, esters, glycols, and the like. The amount of aldehyde hardener is not particularly critical and may range from 0.02 to 1.0 part by weight aldehyde per part modified polymer. The preferred aldehyde is formaldehyde, though the formaldehyde-forming compounds polyoxymethylene, acrolein, trioxane and paraformaldehyde are quite satisfactory. Other aldehydes which may be used include aliphatic or cyclic aldehydes having from 1 to 8 carbon atoms such as glyoxal, acetaldehyde, propionaldehyde, butyraldehyde and furfuraldehyde.

The resulting resins, when modified with an epoxide compound, are characterized by greater flexibility and less shrinkage on curing of the resinous material. The epoxide compound is added to the system in the alkylene donor mixed with aldehyde, the mixture being used in amounts of from as little as 10 parts by weight or as much as 50 parts by weight to about 90 to 50 parts by weight of the modified aldehyde condensation polymer.

A wide variety of epoxide compounds can be used to prepare the resin composition for this invention. They can be saturated or unsaturated, aliphatic, cycloaliphatic, aromatic, or heterocyclic, and monomeric or polymeric in nature. The polyepoxide resins include alicyclic polyepoxides such as vinylcyclohexene dioxides, limonene dioxide, dicyclopentadiene oxide, ethylene-glycol-bis(3,4-epoxy - tetrahydrodicyclopentadiene - 8 - yl)-ether, (3,4-epoxy-tetrahydro-dicyclopentadiene-8-yl) - glycidyl ether; epoxidized poly-butadienes or copolymers of butadiene with ethylenically unsaturated compounds such as styrene or vinyl acetate; compounds containing 2 epoxy-cyclohexyl residues such as diethylene glycol-bis-(3,4-epoxy-cyclohexane - carboxylate, bis - 3,4 - epoxy - cyclohexylmethyl succinate, 3,4-epoxy-6-methylcyclohexylmethyl-3, 4-epoxy-6-methylcyclohexane-carboxylate, and 3,4-epoxyhexa - hydrobenzal-3,4-epoxy - cyclohexane-1,1-dimethanol. Epoxidized esters, for example, epoxidized unsaturated vegetable oils, epoxidized soy bean oil, and epoxidized glycerol trilinoleate may be used. Also polymers and copolymers of vinyl polymerizable monoepoxides such as allyl glycidyl ether, glycidyl acrylate and glycidyl methacrylate may be used. Polyglycidyl esters resulting from the reaction of a dicarboxylic acid with epichlorohydrin or glycerol dichlorohydrin in the presence of an alkali may also be used. These polyesters are derived from aliphatic dicarboxylic acids such as succinic or adipic acid or from aromatic dicarboxylic acids such as phthalic or terephthalic acids.

Additional polyepoxides used in the composition of this invention include glycidyl ethers of polyhydric phenols obtained by reacting a polyhydric phenol with an excess of epichlorohydrin in the presence of sodium hydroxide. Such polyhydric phenols include "bisphenol A" (2,2-bis-[p - hydroxyphenyl]propane), resorcinol, hydroquinone, 4,4 - dihydroxybenzophenone, bis(4 - hydroxyphenyl)ethane, 1,5 - dihydroxynaphthalene, 4,4' - dihydroxybiphenyl and condensation products of phenol with formaldehyde such as resoles or novolacs containing more than 2 phenol moieties linked to methylene bridges, and the like. Also polyglycidyl ethers of polyhydric alcohols may be used. These are made by reacting a polyhydric alcohol and epichlorohydrin with an acidic catalyst such as boron trifluoride and subsequently treating the resulting product with an alkaline material. Included among the polyhydric alcohols that can be used in the preparation of these polyepoxides are glycerine, ethyleneglycol, propyleneglycol, diethyleneglycol, hexanetriol, pentaerythritol, trimethylolethane, trimethylolpropane, and polyhydric ether alcohols such as diglycerol, dipentaerythritol, polyalkylene glycols and hydroxy-ethers of the aforementioned polyhydric phenols.

Other polyepoxide resins useful in this invention are described in "Handbook of Epoxy Resins" by Lee and Neville, McGraw-Hill Book Company, Inc., 1967.

Care is required in the preparation of the foam products using the rapid curing modified polymers described herein. Foaming agents in the desired proportion are rapidly and thoroughly intermixed with the liquid resins. As had been described, when the two components of the resin composition described are blended together reaction takes place transforming the liquid resinous compositions into an insoluble, infusible state within minutes. Therefore, the foaming agent must be either blended with one or both of the components of the resin mixture or simultaneously blended with the resin mixture at substantially the same time that the two components are brought together. Other conventional additives such as inert fillers, silicone fluids to control cell structure, surface active agents, etc., may be incorporated into the foam formulation by conventional techniques recognizing, however, that a proper balance of physical and chemical properties needed for foaming dictates the amount of these additives used.

The foaming agents which may be used to foam the modified resins of this invention include carbon dioxide liberating materials, low boiling aliphatic hydrocarbons, polyhalogenated saturated fluorocarbons and ethers. Exemplary of carbon dioxide liberating compounds are alkali and alkaline earth carbonates such as sodium bicarbonate or calcium carbonate which, in the presence of an acid, liberate carbon dioxide.

Fluorocarbon foaming agents which may be used include monochlorofluoromethane, dichlorodifluoromethane, 1,2-dichloro-1,1,2,2-tetrafluoroethane, 1,1,1-trichloro-2,2,2 - trifluoroethane, 1,2 - difluoroethane and trichlorofluoromethane. The compounds should have boiling points ranging from about 0 to 100° C. Trichlorofluoromethane is preferred.

The quantity of foaming agent required to produce a given density foam of good texture varies with the particular foaming agent used. The amount used, as is known, controls the density of the resulting product. For most purposes, the incorporation of 2 to 50 parts foaming agent per 100 parts per weight of the resin is preferred for making foams within the commercially practical range.

The viscosity of the resin composition into which the foaming agent is incorporated should range from about 200 to 300,000 centipoises. If the viscosity is too low, there is a tendency for the foaming agents to volatilize in the form of large bubbles and cause frothing of the resinous mass with evolution of a great amount of the foaming agent. Foams thus productd are characterized by an open cellular structure and large voids which are not desired in foams used for insulating purposes. The viscosity range required for the particular foaming agent used can be determined by one skilled in the art.

On blending of the foaming agent into the resin composition the reaction mixture may be heated a slight amount to promote volatilization of the foaming agent if a relatively low boiling compound is used. If a carbon dioxide liberating material is used, such as calcium carbonate or sodium bicarbonate, sufficient acid must be added to one or both of the components of the resin composition for reaction with the carbon dioxide liberating compound.

The resin compositions described herein have very rapid curing rates at ambient temperature.

The foams produced by the method described above have a substantially closed cell structure, are substantially infusible and insoluble, are stable, and have low friability. The phenolic foams, in addition, are non-burning or self-extinguishing. The amine-modified phenolics further modified with an epoxide compound as described are preferred as the epoxide compound imparts to the resinous mixture better shrinkage characteristics and greater flexibility. Foamed products having a density ranging from 2 to 50 lbs. per cubic foot can be produced by the methods described herein. The density depends to a large extent on the amount of foaming agent incorporated into the resinous mixtures and can be adjusted accordingly. The foams produced are of a uniform fine cellular structure and are excellent insulating materials. As they are rapid curing they are very useful in foaming-in-place applications where rapid cure times are advantageous. They also make excellent adhesives having desirable gap-filling properties.

The following examples are exemplary of foams produced according to the invention.

EXAMPLE 1

A m - hydroxyaniline - modified phenol - formaldehyde novolac was prepared by charging a reactor with the following components:

| | Parts |
|---|---|
| Phenol 100% | 45.18 |
| Flake paraformaldehyde, 91% | 12.26 |
| Water | 4.74 |
| Calcium acetate monohydrate | 0.5 |

Agitation was applied and the mixture heated to reflux (110° C.) in 60 minutes and held under reflux conditions for about 2 hours to produce a phenol-formaldehyde condensation polymer having reactive alkylol (i.e. methylol) groups. The reaction liquid was then cooled and 20.83 parts m-hydroxyaniline added. The mixture was then again heated to reflux (110° C.) and held for 2½ hours, and then cooled to about 60° C. Methanol, 16.49 parts, was then added. Cooling was then continued until room temperature was reached.

A two-component resin was prepared with the two components having the following formulation:

| Component A: | Wt. percent |
|---|---|
| m-Hydroxyaniline resin described above | 95.04 |
| Concentrated hydrochloric acid | 3.48 |
| Asbestos | 1.48 |
| Component B: | |
| 55% formaldehyde in methanol | 46.72 |
| Calcium carbonate | 4.68 |
| Silica (Cab-o-Sil M-5) | 1.39 |
| Asbestos | 0.49 |
| Epoxide resin (ERL 3794-Union Carbide) a polyglycidyl ether of a phenol-formaldehyde novolac blended with a diglycidyl ether of bisphenol A having an epoxy equivalent wt. of 174-186 and a viscosity of 7000-19000 cps. at 25° C. | 46.72 |

Two parts by weight of Component A were mixed with one part by weight of Component B. The calcium carbonate in Component B reacted with the hydrochloric acid in Component A to liberate carbon dioxide expanding and foaming the resin. This high density foam had excellent stability and was excellent for structural purposes. The foam had the following properties:

Tensile strength—1105 p.s.i.
MOE in tension—1.31×10⁵ p.s.i.
Density—About 40 lbs./ft.³
Gel time—About 60 sec.
Cure time—About 3.5 min.

EXAMPLE 2

A phenol-formaldehyde resole having at least one methylol group was prepared by charging a reactor with the following components:

| | Parts |
|---|---|
| Phenol, 100% | 2458.0 |
| Paraformaldehyde, 91% | 1210.0 |
| Water | 148.0 |

Thirty-four parts of sodium hydroxide was then added and the mixture heated uniformly to 85° C. over a period of 82 minutes. Reaction was continued until a Gardner viscosity of Z was reached, producing a phenol-formaldehyde condensation polymer having reactive alkylol (i.e. methylol) groups.

To 474.9 parts of the above resin was added a slurry of 307.3 parts m-hydroxyaniline in 78.2 parts methanol. Heating and agitation were applied to bring the temperature to reflux (approx. 95° C.) and held at that temperature until all of the m-hydroxyaniline had dissolved (approx. 30 min.). The mixture was cooled to 60° C. and 72.6 parts concentrated hydrochloric acid added. The temperature of the mixture was held at 60° C. to 65° C. for approximately 15 minutes and then 67.0 parts 55% formaldehyde in methanol-water solution slowly added while maintaining the heat of reaction between 65–75° C. The resin mixture was then heated to reflux, held at that temperature for 15 minutes, cooled to 25° C., and removed to storage. The final resin had a Gardner viscosity of between Z and $Z_1$. This amine-modified phenol-formaldehyde polymer constituted Component A of the resin composition.

A second phenol-formaldehyde polymer was prepared by charging a reactor with the following:

| | Parts |
|---|---|
| Phenol, 90.4% | 1280.2 |
| Water | 424.8 |
| Formaldehyde, 50% | 1180.3 |
| Methanol | 97.8 |

The temperature was adjusted to 40° C. and 75.8 parts sodium hydroxide added. The mixture was then heated to 65° C. over a period of 70 minutes at a uniform rate and maintained at the temperature for 1¾ hours. The pH was adjusted to 8.4 by the addition of 25.4 parts 90% formic acid. Additional formaldehyde, 1360.1 parts 50% formaldehyde, was then added and the mixture cooled to 25° C. The final viscosity of the resin was about 14 cps. at 25° C.

Component B of the resin composition was prepared by incorporating the following components in the above mentioned second phenol-formaldehyde polymer:

| | Parts by weight |
|---|---|
| Second phenol-formaldehyde polymer | 80.0 |
| Silicone surfactant (Dow-F-1-1523, a product of Dow-Corning Co.) | 4.0 |
| Polypropylene glycol | 1.0 |
| Foaming agent—trichlorofluoromethane | 15.0 |

Equal parts by weight of Component A and Component B were mixed together. They reacted immediately to form a strong closed cellular foam having a density of 5.1 lbs./cu. ft.

EXAMPLE 3

The following components were added to a reactor: 17,146.1 parts formaldehyde, 50%, 1,270.1 parts water, 4,173.1 parts technical grade acetone. The temperature was adjusted to 40° C. and 45.4 parts of 49.5% sodium hydroxide added. The temperature was adjusted to 30° C. and an additional 45.4 parts of 49.5 weight percent sodium hydroxide added. The temperature was then allowed to rise uniformly to 65° C. over the next 60 minutes. An exothermic reaction was experienced. A temperature of 65–70° C. was maintained for about 20 minutes at which time the exothermic reaction subsided. The resin was then cooled to 25° C. and stored. The acetone-formaldehyde resin was characterized by having reactive alkylol (i.e. methylol) groups, a formaldehyde-acetone molar ratio of about 4.0, and about 14.2% free formaldehyde.

To a second reactor was charged 444.4 parts m-hydroxyaniline and 222.5 parts methanol. The mixture was heated to reflux (about 75° C.) and held at that temperature until the m-hydroxyaniline was dissolved. The solution was then cooled to 60° C. and 333.1 parts of the acetone-formaldehyde resin prepared as described above added in small increments to control the heat of reaction. During addition of the acetone-formaldehyde resin to the m-hydroxyaniline-methanol solution, the temperature was maintained between 60° and 65° C. After all of the acetone-formaldehyde resin was added and the exothermic reaction had subsided, the mixture was heated to reflux (about 80° C.) and held at reflux for about 30 minutes whereupon it was then cooled to 25° C. The resin had a Gardner viscosity between A1 and A at 25° C.

A two-component foamed composition was prepared by reacting 2 parts by weight of Component A with one part by weight of Component B. The two components had the following formulation:

Component A: Parts by weight
Acetone-formaldehyde, m-hydroxyanilne resin described above _____ 75.47
Conc. hydrochloric acid _____ 11.32
Silicone surfactant _____ 5.66
Carbowax 6000 _____ 7.55

Component B:
55% formaldehyde in methanol-water solution 46.72
Calcium carbonate _____ 4.68
Epoxy resin (DEN 431—Dow Chemical Co.—an epoxide resin made by the epoxidation of a phenol-formaldehyde novolac, the epoxide resin having an average of 2.2 epoxy groups per molecule _____ 46.72
Silica (Cab-o-Sil M–5) _____ 1.39
Asbestos _____ 0.49

When the two components were blended a rapid curing foam having a density of 2.6 lbs./ft.$^3$ was formed.

EXAMPLE 4

A four-liter reactor was charged with the following: 2,174.0 parts phenol, 90.4%; 518.8 parts flake paraformaldehyde, 93.5%; 12.0 parts water; and 21.6 parts calcium acetate monohydrate. The mixture was heated under agitation to reflux in about 60 minutes and refluxed at 110° C. for about two hours, producing a condensation polymer having reactive alkylol (i.e. methylol) groups. The reaction liquid was then cooled to about 105° C. and 914.4 parts m-phenylenediamine added. The mixture was again heated to reflux (105° C.) and heating continued for 2½ hours. It was then cooled to 60° C. and 718.7 parts methanol added. Cooling was continued to 25° C. and the resin removed to storage.

A two-component foamed composition was prepared by reacting 2 parts by weight of Component A with one part by weight of Component B. The two components had the following formulation:

Component A: Parts by weight
m-Phenylenediamine resin described above __ 93.18
Conc. hydrochloric acid _____ 6.82

Component B:
55% formaldehyde in methanol-water solution _____ 47.17
Calcium carbonate _____ 4.72
Silica (Cab-o-Sil M–5) _____ 0.94
Epoxy resin (DEN 438—Dow Chemical Co.—an epoxidized phenol-formaldehyde novolac similar to the epoxy resin used in Example 3 _____ 47.17

When the two components were blended a foamed resin having a pot life of 35.5 seconds at 25° C. was formed.

The embodiments of the invention in which an exclusive property or privilege is claimed are defined as follows:

What is claimed is:

1. A process for preparing an insoluble, infusible cellular foam comprising:
(a) reacting one part by weight of an aldehyde condensation polymer having reactive alkylol groups with from 0.05 to 2.0 parts by weight of a nitrogen compound to produce a liquid resin,
(b) adding an alkylene donor and a foaming agent to said liquid resin, and
(c) allowing the resin composition with said foaming agent and alkylene donor incorporated therein to expand into said insoluble, infusible cellular foam;
said aldehyde condensation polymer being selected from the group consisting of aminoplasts, phenoplasts, and ketone-aldehyde condensation polymers; said aldehyde condensation polymer further being one prepared from an aldehyde selected from the group consisting of (i) monofunctional aldehydes, and (ii) polyfunctional aldehydes having at least two aldehyde groups separated by at most one carbon atom;
said alkylene donor comprising an aldehyde provided in the ratio of from 0.02 to 1.0 part by weight per part by weight of said liquid resin; and
said nitrogen compound being selected from the group consisting of
(1) bis(aminoaryl) compounds of the formula:

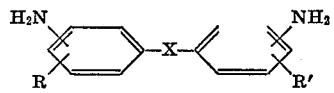

where R and R' are alkoxy, amino, hydrogen, hydroxyl, nitro, carboxyl or $C_1$ to $C_4$ alkyl and X is

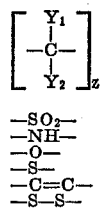

—SO$_2$—
—NH—
—O—
—S—
—C=C—
—S—S— where $Y_1$ and $Y_2$ are hydrogen or alkyl radicals having from 1 to 3 carbon atoms and Z is an integer ranging from 0 to 2;
(2) aminonaphthalenes of the formula:

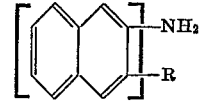

where R may be amino in any open ring position or hydroxyl in the 2, 5 and 8 ring positions when the amine group is in the 1 position;
(3) heterocyclic nitrogen-containing compounds selected from the group consisting of 2,3-, 2,4-, 2,6- or 3,4-diaminopyridine; pyrrole; N-methylpyrrole; 2,4-dimethylpyrrole; or 4,6-diaminopyrimidine.

2. The process according to claim 1 wherein the foaming agent is one selected from the group consisting of carbon dioxide liberating compounds, low boiling aliphatic hydrocarbons, low boiling ethers, and polyhalogenated saturated fluorocarbons.

3. The process according to claim 2 wherein the carbon dioxide liberating compounds include alkali or alkaline earth carbonates which, in the presence of an acid, liberate carbon dioxide.

4. The process according to claim 2 wherein 2 to 50 parts by weight of the foaming agent are incorporated per 100 parts by weight of said liquid resin.

5. The process according to claim 1 wherein the aldehyde condensation polymer is one selected from the group consisting of formaldehyde condensed with phenol, urea, melamineurea, acetone, melamine, phenol-rsorcinol and resorcinol.

6. A process of preparing an insoluble, infusible cellular foam using an amine-modified phenolic resin comprising (a) incorporating into an acidic, liquid, amine-modified phenolic resin 2 to 50 parts by weight per 100 parts by weight of resin of a carbon dioxide liberating chemical selected from the group consisting of alkali and alkaline earth carbonates, and from 2 to 100 parts by weight of aldehyde per 100 parts by weight of resin, and (b) allowing the resin composition to expand to form said insoluble, infusible cellular foam;

said amine-modified phenolic resin being the reaction product of (1) from 0.05 to 2.0 parts by weight of an amine selected from the group consisting of 1,5-diaminonaphthalene, 2,6-diaminopyridine and 4,4'-methylenedianiline, and (2) one part by weight of a phenol-formaldehyde condensation polymer having reactive alkylol groups.

7. An infusible, insoluble cellular foam produced by the method of claim 1.

8. The process of claim 1 wherein the aldehyde of said alkylene donor is admixed with an epoxide, and said aldehyde-epoxide is added to said liquid resin in the ratio of from about 10 to 50 parts by weight of mixture to about 90 to 50 parts by weight of resin.

9. A process for preparing an insoluble, infusible cellular foam comprising:

(a) reacting one part by weight of an aldehyde condensation polymer having reactive alkylol groups with from 0.05 to 2.0 parts by weight of a nitrogen compound to produce a liquid resin.

(b) adding an alkylene donor and a foaming agent to said liquid resin, and (c) allowing the resin composition with said foaming agent and alkylene donor incorporated therein to expand into said insoluble, infusible cellular foam;

said aldehyde condensation polymer being selected from the group consisting of aminoplasts and ketone-aldehyde polymers;

said alkylene donor comprising an aldehyde provided in the ratio of from about 0.02 to 1.0 part by weight per part by weight of said liquid resin; and said nitrogen compound being selected from the group consisting of (1) primary aromatic amines having the formula:

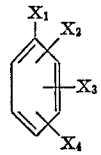

where:

$X_1$ is $-NH_2$
$-CH_2NH_2$ $X_2$ is $-X_1$
$-OH$
$-OCH_3$ $X_3$ is $-X_1$
$-COOH$
$-NO_2$
$-OH$
$-CH_3$
$-NHCOCH_3$
$-H$

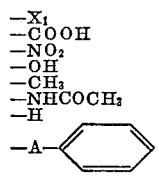

$X_4$ is $C_1$ to $C_4$ alkyl
$-H$ and A is

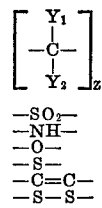

$-SO_2-$
$-NH-$
$-O-$
$-S-$
$-C=C-$
$-S-S-$ where $Y_1$ and $Y_2$ are hydrogen or alkyl radicals having from 1 to 3 carbon atoms and Z is an integer from 0 to 2;

(2) bis(aminoaryl) compounds of the formula:

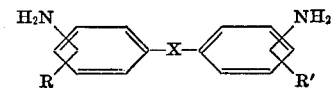

where R and R' are alkoxy, amino, hydrogen, hydroxyl, nitro, carboxyl or $C_1$ to $C_4$ alkyl and X is

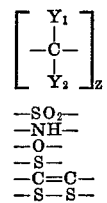

$-SO_2-$
$-NH-$
$-O-$
$-S-$
$-C=C-$
$-S-S-$ where $Y_1$ and $Y_2$ are hydrogen or alkyl radicals having from 1 to 3 carbon atoms and Z is an integer ranging from 0 to 2;

(3) aminonaphthalenes of the formula:

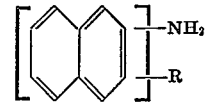

where R may be amino in any open ring position or hydroxyl in the 2, 5 and 8 ring positions when the amine group is in the 1 position; and (4) heterocyclic nitrogen-containing compounds selected from the group consisting of 2,3-, 2,4-, 2,6- or 3,4-diaminopyridine; pyrrole; N-methylpyrrole; 2,4-dimethylpyrrole; or 4,6-diaminopyrimidine.

10. The process according to claim 9 wherein the foaming agent is one selected from the group consisting of carbon dioxide liberating compounds, low boiling aliphatic hydrocarbons, low boiling ethers, and polyhalogenated saturated fluorocarbons.

11. The process according to claim 10 wherein the carbon dioxide liberating compounds include alkali or alkaline earth carbonates which, in the presence of an acid, liberate carbon dioxide.

12. The process according to claim 10 wherein 2 to 50 parts by weight of the foaming agent are incorporated per 100 parts by weight of said liquid resin.

13. The process according to claim 9 wherein the aldehyde condensation polymer is one selected from the group consisting of formaldehyde condensed with urea, melamine-urea, acetone and melamine.

14. A process of preparing an insoluble, infusible cellular foam using an amine-modified aldehyde condensation polymer resin comprising (a) incorporating into an acidic, liquid, amine-modified aldehyde condensation polymer resin 2 to 50 parts by weight per 100 parts by weight of resin of a carbon dioxide liberating chemical selected from the group consisting of alkali and alkaline earth carbonates, and from about 2 to 100 parts by weight of aldehyde per 100 parts by weight of said resin, and (b) allowing the resin composition to expand to form said insoluble, infusible cellular foam;
said amine-modified aldehyde condensation polymer resin being the reaction product of
(1) from 0.05 to 2.0 parts by weight of an amine selected from the group consisting of m-phenylenediamine, m-hydroxyaniline, 1,5-diaminonaphthalene, 2,6-diaminopyridine and 4,4'-methylenedianiline, and
(2) one part by weight of an aldehyde condensation polymer having reactive alkylol groups and selected from the group consisting of formaldehyde condensed with urea, melamine-urea, acetone, and melamine.

15. An infusible, insoluble cellular foam produced by the method of claim 9.

16. The process of claim 9 wherein the aldehyde of said alkylene donor is admixed with an epoxide, and said aldehyde-epoxide mixture is added to said liquid resin in the ratio of from about 10 to 50 parts by weight of mixture to about 90 to 50 parts by weight of resin.

References Cited

UNITED STATES PATENTS

| | | | |
|---|---|---|---|
| 3,518,159 | 6/1970 | Freeman et al. | 260—51.5 |
| 3,186,969 | 6/1965 | Cox et al. | 260—2.5 F |

SAMUEL H. BLECH, Primary Examiner

M. FOELAK, Assistant Examiner

U.S. Cl. X.R.

260—18 EP, 19 EP, 21, 37 R, 37 EP, 38, 39 R, 51.5, 59, 64, 67.5, 72 R, 72.5, 828, 830, 834

PO-1050
(5/69)

UNITED STATES PATENT OFFICE
CERTIFICATE OF CORRECTION

Patent No. 3,704,269      Dated Nov. 28, 1972

Inventor(s) HARLAN G. FREEMAN ET AL

It is certified that error appears in the above-identified patent and that said Letters Patent are hereby corrected as shown below:

In column 2, line 57, " R" " should read -- R' --;

in column 8, line 46, "productd" should read --produced--;

in column 12, line 71, "phenol-rsorcinol" should read

--phenol-resorcinol--;

in column 13, line 22, "hyde-epoxide is" should read

--hyde-epoxide mixture is--;

in column 13, lines 65 through 70, -- $-OCH_3$ -- should be inserted between $-NO_2$ and -OH.

Signed and sealed this 1st day of May 1973.

(SEAL)
Attest:

EDWARD M. FLETCHER, JR.      ROBERT GOTTSCHALK
Attesting Officer                Commissioner of Patents